(12) United States Patent
Avudaiyappan et al.

(10) Patent No.: US 10,210,101 B2
(45) Date of Patent: *Feb. 19, 2019

(54) SYSTEMS AND METHODS FOR FLUSHING A CACHE WITH MODIFIED DATA

(71) Applicant: Intel Corporation, Santa Clara, CA (US)

(72) Inventors: Karthikeyan Avudaiyappan, Sunnyvale, CA (US); Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,432

(22) Filed: Nov. 27, 2017

(65) Prior Publication Data

US 2018/0081822 A1 Mar. 22, 2018

Related U.S. Application Data

(63) Continuation of application No. 15/353,053, filed on Nov. 16, 2016, now Pat. No. 9,858,206, which is a
(Continued)

(51) Int. Cl.
*G06F 12/126* (2016.01)
*G06F 12/128* (2016.01)
(Continued)

(52) U.S. Cl.
CPC ........ *G06F 12/128* (2013.01); *G06F 12/0802* (2013.01); *G06F 12/0808* (2013.01);
(Continued)

(58) Field of Classification Search
CPC .. G06F 12/126; G06F 12/0802; G06F 12/128; G06F 12/0808; G06F 12/0811;
(Continued)

(56) References Cited

U.S. PATENT DOCUMENTS 4,075,704 A 2/1978 O'Leary
4,245,344 A 1/1981 Richter
(Continued)

FOREIGN PATENT DOCUMENTS

CN 1305150 A 7/2001
EP 0596636 A2 5/1994
(Continued)

OTHER PUBLICATIONS

Notice of Allowance from U.S. Appl. No. 13/561,528, dated May 2, 2016, 10 pages.
(Continued)

*Primary Examiner* — Michael Krofcheck
(74) *Attorney, Agent, or Firm* — NDWE LLP

(57) ABSTRACT

Systems and methods for flushing a cache with modified data are disclosed. Responsive to a request to flush data from a cache with modified data to a next level cache that does not include the cache with modified data, the cache with modified data is accessed using an index and a way and an address associated with the index and the way is secured. Using the address, the cache with modified data is accessed a second time and an entry that is associated with the address is retrieved from the cache with modified data. The entry is placed into a location of the next level cache.

20 Claims, 5 Drawing Sheets

Related U.S. Application Data continuation of application No. 13/561,491, filed on Jul. 30, 2012, now Pat. No. 9,710,399.

(51) Int. Cl.
  *G06F 12/0802* (2016.01)
  *G06F 12/0808* (2016.01)
  *G06F 12/0811* (2016.01)

(52) U.S. Cl.
  CPC ........ *G06F 12/0811* (2013.01); *G06F 12/126* (2013.01); *G06F 2212/283* (2013.01); *G06F 2212/608* (2013.01); *G06F 2212/70* (2013.01)

(58) Field of Classification Search
  CPC ............... G06F 12/08; G06F 2212/283; G06F 2212/69; G06F 2212/608; G06F 2212/70
  See application file for complete search history.

(56) References Cited

U.S. PATENT DOCUMENTS

| | | | |
|---|---|---|---|
| 4,356,550 A | 10/1982 | Katzman et al. | |
| 4,414,624 A | 11/1983 | Summer, Jr. et al. | |
| 4,524,415 A | 6/1985 | Mills, Jr. et al. | |
| 4,527,237 A | 7/1985 | Frieder et al. | |
| 4,577,273 A | 3/1986 | Hopper et al. | |
| 4,597,061 A | 6/1986 | Cline et al. | |
| 4,600,986 A | 7/1986 | Scheuneman et al. | |
| 4,633,434 A | 12/1986 | Scheuneman | |
| 4,682,281 A | 7/1987 | Woffinden et al. | |
| 4,816,991 A | 3/1989 | Watanabe et al. | |
| 4,920,477 A | 4/1990 | Colwell et al. | |
| 5,294,897 A | 3/1994 | Notani et al. | |
| 5,317,705 A | 5/1994 | Gannon et al. | |
| 5,317,754 A | 5/1994 | Blandy et al. | |
| 5,548,742 A | 8/1996 | Wang et al. | |
| 5,559,986 A | 9/1996 | Alpert et al. | |
| 5,574,878 A | 11/1996 | Onodera et al. | |
| 5,581,725 A | 12/1996 | Nakayama | |
| 5,634,068 A | 5/1997 | Nishtala et al. | |
| 5,752,260 A | 5/1998 | Liu | |
| 5,754,818 A | 5/1998 | Mohamed | |
| 5,787,494 A | 7/1998 | Delano et al. | |
| 5,793,941 A | 8/1998 | Pencis et al. | |
| 5,802,602 A | 9/1998 | Rahman et al. | |
| 5,806,085 A | 9/1998 | Berliner | |
| 5,813,031 A | 9/1998 | Chou et al. | |
| 5,835,951 A | 11/1998 | McMahan | |
| 5,852,738 A | 12/1998 | Bealkowski et al. | |
| 5,860,146 A | 1/1999 | Vishin et al. | |
| 5,864,657 A | 1/1999 | Stiffler | |
| 5,872,985 A | 2/1999 | Kimura | |
| 5,881,277 A | 3/1999 | Bondi et al. | |
| 5,903,750 A | 5/1999 | Yeh et al. | |
| 5,905,509 A | 5/1999 | Jones et al. | |
| 5,918,251 A | 6/1999 | Yamada et al. | |
| 5,956,753 A | 9/1999 | Glew et al. | |
| 5,974,506 A | 10/1999 | Sicola et al. | |
| 6,016,533 A | 1/2000 | Tran | |
| 6,073,230 A | 6/2000 | Pickett et al. | |
| 6,075,938 A | 6/2000 | Bugnion et al. | |
| 6,088,780 A | 7/2000 | Yamada et al. | |
| 6,092,172 A | 7/2000 | Nishimoto et al. | |
| 6,101,577 A | 8/2000 | Tran | |
| 6,115,809 A | 9/2000 | Mattson, Jr. et al. | |
| 6,134,634 A | 10/2000 | Marshall, Jr. et al. | |
| 6,138,226 A | 10/2000 | Yoshioka et al. | |
| 6,157,998 A | 12/2000 | Rupley, II et al. | |
| 6,167,490 A | 12/2000 | Levy et al. | |
| 6,205,545 B1 | 3/2001 | Shah et al. | |
| 6,212,613 B1 | 4/2001 | Belair | |
| 6,226,732 B1 | 5/2001 | Pei et al. | |
| 6,247,097 B1 | 6/2001 | Sinharoy | |
| 6,253,316 B1 | 6/2001 | Tran et al. | |
| 6,256,727 B1 | 7/2001 | McDonald | |
| 6,256,728 B1 | 7/2001 | Witt et al. | |
| 6,260,131 B1 | 7/2001 | Kikuta et al. | |
| 6,260,138 B1 | 7/2001 | Harris | |
| 6,272,662 B1 | 8/2001 | Jadav et al. | |
| 6,275,917 B1 | 8/2001 | Okada | |
| 6,321,298 B1 | 11/2001 | Hubis | |
| 6,332,189 B1 | 12/2001 | Baweja et al. | |
| 6,341,324 B1 | 1/2002 | Caulk, Jr. et al. | |
| 6,437,789 B1 | 8/2002 | Tidwell et al. | |
| 6,449,671 B1 | 9/2002 | Patkar et al. | |
| 6,457,120 B1 | 9/2002 | Sinharoy | |
| 6,557,083 B1 | 4/2003 | Sperber et al. | |
| 6,594,755 B1 | 7/2003 | Nuechterlein et al. | |
| 6,604,187 B1 | 8/2003 | McGrath et al. | |
| 6,609,189 B1 | 8/2003 | Kuszmaul et al. | |
| 6,658,549 B2 | 12/2003 | Wilson et al. | |
| 6,681,395 B1 | 1/2004 | Nishi | |
| 6,907,600 B2 | 6/2005 | Neiger et al. | |
| 6,912,644 B1 | 6/2005 | O'Connor et al. | |
| 7,007,108 B2 | 2/2006 | Emerson et al. | |
| 7,111,145 B1 | 9/2006 | Chen et al. | |
| 7,143,273 B2 | 11/2006 | Miller et al. | |
| 7,149,872 B2 | 12/2006 | Rozas et al. | |
| 7,213,106 B1 | 5/2007 | Koster et al. | |
| 7,278,030 B1 | 10/2007 | Chen et al. | |
| 7,380,096 B1 | 5/2008 | Rozas et al. | |
| 7,383,390 B1 * | 6/2008 | Maessen ............ | G06F 12/0817 711/133 |
| 7,406,581 B2 | 7/2008 | Southwell et al. | |
| 7,546,420 B1 | 6/2009 | Shar et al. | |
| 7,680,988 B1 | 3/2010 | Nickolls et al. | |
| 7,783,868 B2 | 8/2010 | Ukai | |
| 7,856,530 B1 | 12/2010 | Mu | |
| 7,913,058 B2 | 3/2011 | Rozas et al. | |
| 8,145,844 B2 | 3/2012 | Bruce | |
| 8,239,656 B2 | 8/2012 | Rozas et al. | |
| 8,301,847 B2 | 10/2012 | Dantzig et al. | |
| 8,522,253 B1 | 8/2013 | Rozas et al. | |
| 8,868,838 B1 | 10/2014 | Glasco et al. | |
| 8,930,674 B2 | 1/2015 | Avudaiyappan et al. | |
| 9,047,178 B2 | 6/2015 | Talagala et al. | |
| 2001/0049782 A1 | 12/2001 | Hsu et al. | |
| 2002/0069326 A1 | 6/2002 | Richardson et al. | |
| 2002/0082824 A1 | 6/2002 | Neiger et al. | |
| 2002/0099913 A1 | 7/2002 | Steely et al. | |
| 2003/0065887 A1 | 4/2003 | Maiyuran et al. | |
| 2003/0088752 A1 | 5/2003 | Harman | |
| 2004/0034762 A1 | 2/2004 | Kacevas | |
| 2004/0044850 A1 | 3/2004 | George et al. | |
| 2004/0064668 A1 | 4/2004 | Kjos et al. | |
| 2004/0093483 A1 | 5/2004 | Nguyen et al. | |
| 2004/0103251 A1 | 5/2004 | Alsup | |
| 2004/0117593 A1 | 6/2004 | Uhlig et al. | |
| 2004/0117594 A1 | 6/2004 | Vanderspek | |
| 2004/0143727 A1 | 7/2004 | McDonald | |
| 2004/0193857 A1 | 9/2004 | Miller et al. | |
| 2004/0205296 A1 | 10/2004 | Bearden | |
| 2004/0215886 A1 | 10/2004 | Cargnoni et al. | |
| 2004/0225872 A1 | 11/2004 | Bonanno et al. | |
| 2005/0005085 A1 | 1/2005 | Miyanaga | |
| 2005/0027961 A1 | 2/2005 | Zhang | |
| 2005/0060457 A1 | 3/2005 | Olukotun | |
| 2005/0108480 A1 | 5/2005 | Correale, Jr. et al. | |
| 2005/0154867 A1 | 7/2005 | DeWitt, Jr. et al. | |
| 2006/0004964 A1 | 1/2006 | Conti et al. | |
| 2006/0026381 A1 | 2/2006 | Doi et al. | |
| 2006/0190707 A1 | 8/2006 | McIlvaine et al. | |
| 2006/0236074 A1 | 10/2006 | Williamson et al. | |
| 2006/0277365 A1 | 12/2006 | Pong | |
| 2008/0077813 A1 | 3/2008 | Keller et al. | |
| 2008/0091880 A1 | 4/2008 | Vishin | |
| 2008/0126771 A1 | 5/2008 | Chen et al. | |
| 2008/0195844 A1 | 8/2008 | Shen et al. | |
| 2008/0215865 A1 | 9/2008 | Hino et al. | |
| 2008/0235500 A1 | 9/2008 | Davis et al. | |
| 2008/0270758 A1 | 10/2008 | Ozer et al. | |
| 2008/0270774 A1 | 10/2008 | Singh et al. | |
| 2008/0282037 A1 | 11/2008 | Kusachi et al. | |
| 2009/0138659 A1 | 5/2009 | Lauterbach | |

(56) References Cited

U.S. PATENT DOCUMENTS

| | | |
|---|---|---|
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0172344 A1 | 7/2009 | Grochowski et al. |
| 2009/0287912 A1 | 11/2009 | Sendag |
| 2010/0138607 A1 | 6/2010 | Hughes et al. |
| 2010/0169578 A1 | 7/2010 | Nychka et al. |
| 2010/0169611 A1 | 7/2010 | Chou et al. |
| 2010/0211746 A1 | 8/2010 | Tsukishiro |
| 2011/0010521 A1 | 1/2011 | Wang et al. |
| 2011/0082980 A1 | 4/2011 | Gschwind et al. |
| 2011/0082983 A1 | 4/2011 | Koktan |
| 2011/0153955 A1 | 6/2011 | Herrenschmidt et al. |
| 2012/0005462 A1 | 1/2012 | Hall et al. |
| 2012/0042126 A1 | 2/2012 | Krick et al. |
| 2013/0019047 A1 | 1/2013 | Podvalny et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0304991 A1 | 11/2013 | Boettcher et al. |
| 2013/0311759 A1 | 11/2013 | Abdallah et al. |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0156947 A1 | 6/2014 | Avudaiyappan |
| 2014/0281242 A1 | 9/2014 | Abdallah et al. |
| 2016/0041908 A1 | 2/2016 | Avudaiyappan et al. |
| 2016/0041913 A1 | 2/2016 | Avudaiyappan et al. |
| 2016/0041930 A1 | 2/2016 | Avudaiyappan |

FOREIGN PATENT DOCUMENTS

| | | |
|---|---|---|
| EP | 0706133 A2 | 4/1996 |
| GB | 2343270 A | 5/2000 |
| TW | 200707284 | 3/1995 |
| TW | 539996 B | 7/2003 |
| TW | 200401187 A | 1/2004 |
| TW | 591530 B | 6/2004 |
| TW | 1233545 B | 6/2005 |
| TW | 1281121 B | 5/2007 |
| WO | 0125921 A1 | 4/2001 |

OTHER PUBLICATIONS

Notice of Allowance from U.S. Appl. No. 13/561,528, dated Oct. 21, 2015, 9 pages.
Notice of Allowance from U.S. Appl. No. 13/561,570, dated Aug. 27, 2015, 9 pages.
Notice of Allowance from U.S. Appl. No. 13/561,570, dated Dec. 7, 2015, 7 pages.
Notice of Allowance from U.S. Appl. No. 13/561,570, dated Jan. 29, 2015, 9 pages.
Notice of Allowance from U.S. Appl. No. 13/561,570, dated Jun. 20, 2014, 8 pages.
Notice of Allowance from U.S. Appl. No. 13/561,570, dated May 20, 2015, 9 pages.
Notice of Allowance from U.S. Appl. No. 13/561,570, dated Oct. 22, 2014, 16 pages.
Notice of Allowance from U.S. Appl. No. 14/173,602, dated Nov. 9, 2017, 39 pages.
Notice of Allowance from U.S. Appl. No. 14/922,035, dated Apr. 10, 2017, 21 pages.
Notice of Allowance from U.S. Appl. No. 14/922,035, dated Jan. 27, 2017, 5 pages.
Notice of Allowance from U.S. Appl. No. 14/922,042, dated Mar. 30, 2017, 35 pages.
Notice of Allowance from U.S. Appl. No. 15/353,053, dated Sep. 7, 2017, 11 pages.
Rotenberg E., et al., "Trace Cache: a Low Latency Approach to High Bandwidth Instruction Fetching," MICRO 29—Proceedings of the 29th annual ACM/IEEE international symposium on Microarchitecture, IEEE Computer Society, Apr. 11, 1996, 48 pages.
Techopedia, Cache Memory Definition, www.techopedia.com/definition/6307/cache-memory, 1 page.
Wallace S., et al.,"Multiple Branch and Block Prediction," Third International symposium on High-Performance Computer Architecture, IEEE, Feb. 1997, pp. 94-103.
Ye, et al., "A New Recovery Mechanism in Superscalar Microprocessors by Recovering Critical Misprediction," IEICE Transactions on Fundamentals of Electronics, Communications and Computer Sciences, The Institute of Electronics, Information and Communication Engineers, Dec. 1, 2011, vol. E94-A (12), pp. 2639-2648.
Yeh, et al., "Increasing the Instruction Fetch Rate Via Multiple Branch Prediction and a Branch Address Cache," ICS 93, Proceedings of the 7th International Conference on Supercomputing, ACM, New York, NY, Jul. 19-23, 1993, pp. 67-76.
Barham P., et al., "Xen and the Art of Virtualization," Proceedings of the ACM Symposium on Operating Systems Principles, XP002298786, Oct. 2003, pp. 164-177.
Cooperman, "Cache Basics," Winter 2003, downloaded from http://www.ccs.neu.edu/course/com3200/parent/NOTES/cache-basics.html on Sep. 24, 2015, 3 pages. (no publication month available).
Final Office Action from U.S. Appl. No. 13/561,441, dated Oct. 14, 2016, 14 pages.
Final Office Action from U.S. Appl. No. 13/561,441, dated Sep. 26, 2014, 16 pages.
Final Office Action from U.S. Appl. No. 13/561,491, dated Jan. 14, 2015, 14 pages.
Final Office Action from U.S. Appl. No. 13/561,491, dated Nov. 12, 2014, 14 pages.
Final Office Action from U.S. Appl. No. 13/561,491, dated Oct. 13, 2015, 16 pages.
Final Office Action from U.S. Appl. No. 13/561,528, dated Nov. 10, 2014, 19 pages.
Final Office Action from U.S. Appl. No. 14/173,602, dated Apr. 13, 2017, 26 pages.
Final Office Action from U.S. Appl. No. 14/173,602, dated Jan. 8, 2016, 32 pages.
Final Office Action from U.S. Appl. No. 14/173,602, dated Jan. 9, 2017, 18 pages.
Final Office Action from U.S. Appl. No. 14/922,035, dated Oct. 14, 2016, 29 pages.
Final Office Action from U.S. Appl. No. 14/922,042, dated Oct. 14, 2016, 15 pages.
Final Office Action from U.S. Appl. No. 14/922,053, dated May 23, 2017, 43 pages.
Final Office Action from U.S. Appl. No. 14/922,053, dated Oct. 14, 2016, 16 pages.
Final Office Action from U.S. Appl. No. 15/353,053, dated Jun. 16, 2017, 45 pages.
Garmany J., "The Power of Indexing: Oracle Tips by Burleson Consulting," Burleson Enterprises, Inc., archived on Mar. 9, 2009, retrieved Sep. 17, 2015 via Internet: web.archive.org/web/20090309201136/http://dba-oracle.com/t_indexing_power.htm, 7 pages.
International Preliminary Report on Patentability for Application No. PCT/US2013/051128, dated Feb. 12, 2015, 8 pages.
International Search Report and Written Opinion for Application No. PCT/US2013/051128, dated Oct. 30, 2013, 9 pages.
Jacobson, et al., "Path-based Next Trace Prediction," MICRO 30—Proceedings of the 30th Annual IEEE/ACM International Symposium on Microarchitecture, Dec. 1-3, 1997, IEEE Computer Society, Washington, D.C., 1997, pp. 14-23.
Nanda, et al., "The Misprediction Recovery Cache," International Journal of Parallel Programming—Special issue: MICRO-29, 29th annual IEEE/ACM international symposium on microarchitecture, Plenum Press, New York, NY, Aug. 1998, vol. 26 (4), pp. 383-415.
Non-Final Office Action from U.S. Appl. No. 13/561,441, dated Dec. 22, 2014, 13 pages.
Non-Final Office Action from U.S. Appl. No. 13/561,441, dated Jan. 9, 2017, 17 pages.

(56) References Cited

OTHER PUBLICATIONS

Non-Final Office Action from U.S. Appl. No. 13/561,441, dated Jun. 4, 2014, 12 pages.
Non-Final Office Action from U.S. Appl. No. 13/561,441, dated May 17, 2016, 17 pages.
Non-Final Office Action from U.S. Appl. No. 13/561,491, dated Feb. 8, 2016, 16 pages.
Non-Final Office Action from U.S. Appl. No. 13/561,491, dated Jun. 16, 2014, 13 pages.
Non-Final Office Action from U.S. Appl. No. 13/561,491, dated May 5, 2015, 15 pages.
Non-Final Office Action from U.S. Appl. No. 13/561,528, dated Dec. 19, 2014, 13 pages.
Non-Final Office Action from U.S. Appl. No. 13/561,528, dated Jun. 17, 2014, 11 pages.
Non-Final Office Action from U.S. Appl. No. 14/173,602, dated Jul. 29, 2016, 19 pages.
Non-Final Office Action from U.S. Appl. No. 14/173,602, dated Sep. 8, 2015, 32 pages.
Non-Final Office Action from U.S. Appl. No. 14/922,035, dated Jun. 21, 2016, 13 pages.
Non-Final Office Action from U.S. Appl. No. 14/922,042, dated Apr. 7, 2016, 16 pages.
Non-Final Office Action from U.S. Appl. No. 14/922,042, dated Dec. 14, 2016, 20 pages.
Non-Final Office Action from U.S. Appl. No. 14/922,053, dated Apr. 7, 2016, 15 pages.
Non-Final Office Action from U.S. Appl. No. 14/922,053, dated Dec. 15, 2016, 16 pages.
Notice of Allowance from U.S. Appl. No. 13/561,441, dated Apr. 21, 2017, 20 pages.
Notice of Allowance from U.S. Appl. No. 13/561,441, dated Feb. 2, 2016, 10 pages.
Notice of Allowance from U.S. Appl. No. 13/561,441, dated Jun. 23, 2015, 14 pages.
Notice of Allowance from U.S. Appl. No. 13/561,441, dated Mar. 18, 2015, 8 pages.
Notice of Allowance from U.S. Appl. No. 13/561,441, dated Oct. 21, 2015, 10 pages.
Notice of Allowance from U.S. Appl. No. 13/561,491, dated Dec. 19, 2016, 13 pages.
Notice of Allowance from U.S. Appl. No. 13/561,491, dated Jun. 8, 2016, 12 pages.
Notice of Allowance from U.S. Appl. No. 13/561,491, dated Mar. 31, 2017, 12 pages.
Notice of Allowance from U.S. Appl. No. 13/561,491, dated Sep. 14, 2016, 18 pages.
Notice of Allowance from U.S. Appl. No. 13/561,528, dated Aug. 3, 2016, 6 pages.
Notice of Allowance from U.S. Appl. No. 13/561,528, dated Feb. 8, 2016, 15 pages.
Notice of Allowance from U.S. Appl. No. 13/561,528, dated Jul. 13, 2015, 14 pages.
Notice of Allowance from U.S. Appl. No. 13/561,528, dated Mar. 31, 2015, 5 pages.

\* cited by examiner

SYSTEMS AND METHODS FOR FLUSHING A CACHE WITH MODIFIED DATA

CROSS-REFERENCE TO RELATED APPLICATIONS

This application is a continuation of U.S. application Ser. No. 15/353,053, filed Nov. 16, 2016, which application is a continuation of U.S. patent application Ser. No. 13/531,491, filed Jul. 30, 2012, which are herein incorporated by reference in their entirety.

A cache in a central processing unit is a data storage structure that is used by the central processing unit of a computer to reduce the average time that it takes to access memory. It is a memory which stores copies of data that is located in the most frequently used main memory locations. Cache memory is memory that is smaller in storage capacity than main memory but is memory that can be accessed much more quickly.

A cache is considered to be full when it does not have space available to accommodate incoming data. When a cache is full, writes to the cache can be prevented from proceeding. Accordingly, write stalls can occur until a successful write-back or flushing of data that is maintained in the cache is executed and space is created to accommodate the incoming data.

Cache flushing removes an entry or entries from the cache such that space is freed for incoming data. The removal can be from the cache to a next level cache. This can be done either manually or automatically.

Some conventional caches are organized such that the contents of a lower level cache are contained in a next higher level cache. Such organization can provide performance advantages and disadvantages. However, some higher level caches may not include the contents of the lower level cache. In particular, the cache line entries of a lower level cache with modified data may not be included in the next level cache. A problem can arise when cache line entries of a cache with modified data that are not included in a next level cache needs to be flushed from the cache with modified data to the next level cache. If a lower level cache is included in a higher level cache, it is enough to flush the higher level cache to the next higher level cache (relative to itself) or main memory. When a lower level cache is not included in a higher level cache, the flush operation of this higher level cache cannot simultaneously effect the flushing of the lower level cache as well.

A conventional approach to flushing cache line entries from a cache with modified data to a next level cache in such circumstances is to stop the traffic on one of the ports of the cache with modified data and to inject flush requests from that port to write-back cache line entries from the cache with modified data one index and way at a time. However, this approach can have adverse timing impacts and has the potential to degrade performance. In addition, this approach can require a complex implementation.

SUMMARY

Conventional approaches to flushing data from a cache with modified data to a next level cache can have adverse timing impacts that can degrade performance. In addition, such approaches can require a complex implementation. A method for flushing data from a lower level cache (a cache with modified data in one embodiment) to a higher level (e.g., a next level cache) is disclosed that addresses these shortcomings. However, the claimed embodiments are not limited to implementations that address any or all of the aforementioned shortcomings. As a part of the method, responsive to a request to flush data from a cache with modified data to a next level cache that does not include the cache with modified data, the cache with modified data is accessed using an index and a way to secure the address associated with that index and the way. Using this address, the cache with modified data is accessed a second time and an entry that is associated with the address is retrieved from the cache with modified data. The entry is placed into a location of the next level cache. The aforementioned methodology does not negatively impact timing or degrade performance. In addition, the methodology is amenable to a straightforward implementation.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
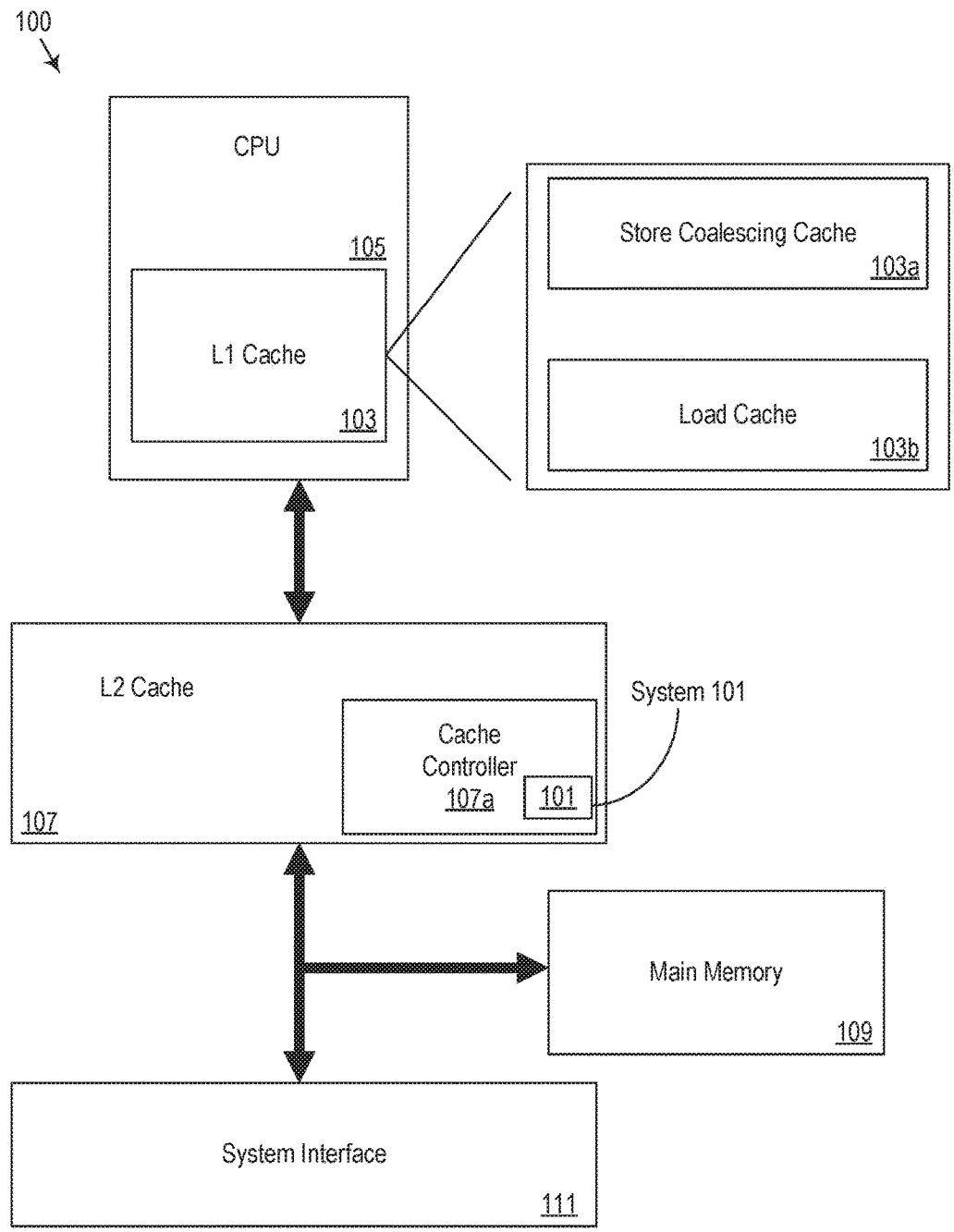
FIG. 1A shows an exemplary operating environment of a system for flushing a cache with modified data according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "identifying" or "placing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of a System for Flushing a Cache with Modified Data According to One Embodiment FIG. 1A shows an exemplary operating environment 100 of a system 101 for flushing a cache with modified data according to one embodiment. System 101 directs, in response to a periodic request to flush data from a cache with modified data to a next level cache that does not include the cache with modified data, an access of the cache with modified data based on an index and way to secure (e.g., identify) an address associated with the data to be flushed. Subsequently, the address is used to access the cache with modified data a second time to obtain the data to be flushed, which is then written into a location (e.g., index) of the next level cache. FIG. 1A shows system 101, L1 cache 103, L1 store coalescing cache 103a (e.g., cache with modified data), load cache 103b, CPU 105, L2 cache 107 (e.g., next level cache), L2 cache controller 107a, main memory 109 and system interface 111. It should be appreciated that store coalescing cache 103a is termed "cache with modified data" as it maintains data that can be modified by stores that update or modify the data.

Referring FIG. 1A, L1 cache 103 is a level 1 cache and L2 cache 107 is a level 2 cache. In one embodiment, L1 cache 103 includes store coalescing cache 103a and load cache 103b. Store coalescing cache 103a maintains entries that are accessed by store request and load cache 103b maintains entries that are accessed by load requests. In one embodiment, store coalescing cache 103a is a part of L1 cache 103 but is not included in L2 cache 107 (e.g., the next level cache). Requests to flush data from store coalescing cache 103a to L2 cache 107 which are received by L2 cache 107 involve obtaining an address from store coalescing cache 103a before store coalescing cache 103a can be probed for the information associated with the address. In one embodiment, the access of store coalescing cache 103a is facilitated by a probe that couples L2 cache 207 and store coalescing cache 103a (see FIG. 1B).

In one embodiment, because store coalescing cache 103a is not included in L2 cache 107, requests to flush store coalescing cache 103a to L2 cache 107 can cause stalls in the absence of a mechanism for facilitating the acquisition by L2 cache 107 of information that is needed to flush data from store coalescing cache 103a to L2 cache 107. In one embodiment, this mechanism is provided by system 101, which as a part of its operation directs a securing of information from store coalescing cache 103a that is needed to access store coalescing cache 103a at the pipeline speed of L2 cache 107. In one embodiment, L2 cache 107 controls the probe that is used to access and read data from store coalescing cache 103a.

Figure 1B:
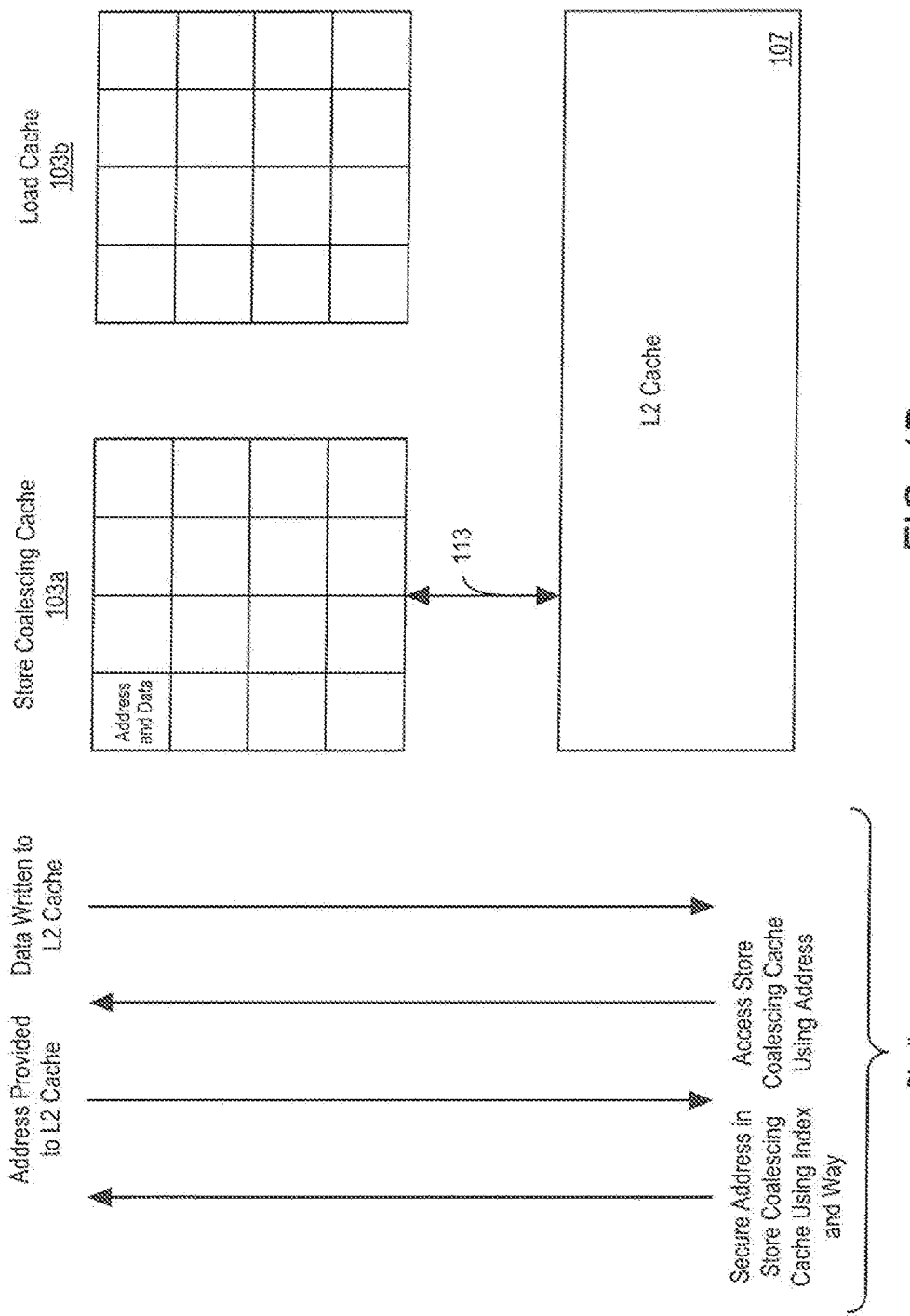
FIG. 1B illustrates, responsive to a request to access a level two cache, the accessing of a store coalescing cache using an index and a way to obtain an address corresponding to data that is to be flushed to a level two cache according to one embodiment.

Referring to FIG. 1B, system 101, responsive to a request to flush data from store coalescing cache 103a to L2 cache 107, directs a probe of store coalescing cache 103a using an index and a way to secure an address corresponding to data that is to be flushed to L2 cache 107 (see arrows corresponding to pipeline in FIG. 1B). In one embodiment, the access of store coalescing cache 103a is facilitated by probe 113 that is controlled by L2 cache 107. As a result of the probe, the address is provided to L2 cache 107. Then, the address is used to probe store coalescing cache 103a a second time to obtain the data that is to be flushed from store coalescing cache 103a. Thereafter, the data is written to L2 cache 107 (see arrows corresponding to pipeline). In one embodiment, as shown in FIG. 1A, based on the operation of system 101, data is accessed and flushed from store coalescing cache 103a at the speed of the L2 cache pipeline. In one embodiment, system 101 can be located in cache controller 107a. In other embodiments, system 101 can be separate from cache controller 107a, but operate cooperatively therewith.

Referring again to FIG. 1A, main memory 109 includes physical addresses that store the information that is copied into cache memory. In one embodiment, when the information that is contained in the physical addresses of main memory that have been cached is changed, the corresponding cached information is updated to reflect the changes made to the information stored in main memory. Also shown in FIG. 1A is system interface 111.

Operation

Figure 1C:
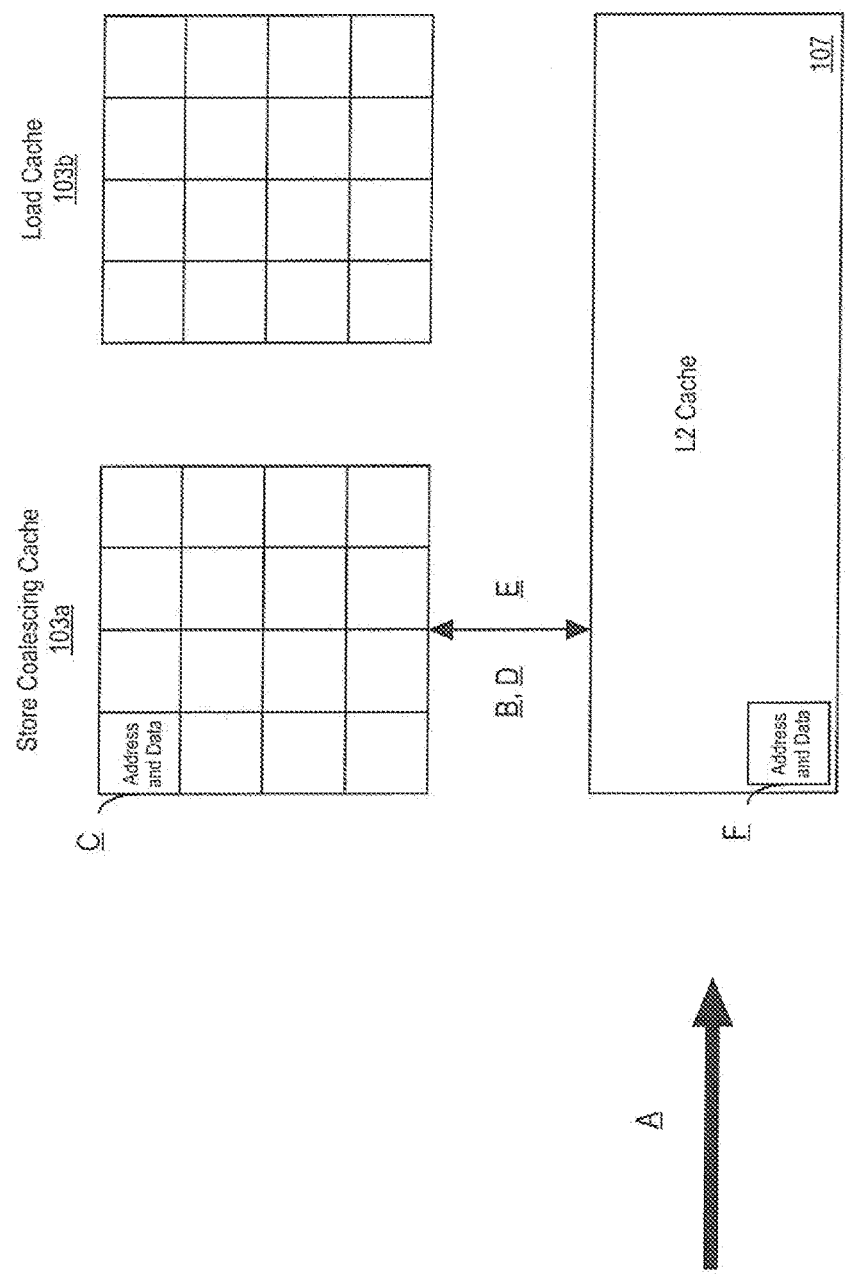
FIG. 1C illustrates operations performed by a system for flushing a cache with modified data according to one embodiment.

FIG. 1C illustrates operations performed by a system for flushing a cache with modified data according to one embodiment. These operations, which relate to flushing a cache with modified data are illustrated for purposes of clarity and brevity. It should be appreciated that other operations not illustrated by FIG. 1C can be performed in accordance with one embodiment.

Referring to FIG. 1C, at A, a request to flush data that is present in a cache with modified data (e.g., store coalescing cache 103a in FIG. 1A) that corresponds to a specific address is received.

At B, a probe of the cache with modified data (e.g., store coalescing cache 103a in FIG. 1A), using the index and way where the data is located in the cache with modified data, is executed.

At C, the address in the cache with modified data (e.g., store coalescing cache 103a in FIG. 1A) residing at the aforementioned index and way is secured (e.g., identified) and provided to a next level cache (e.g., L2 cache 107 in FIG. 1A).

At D, the address is used to probe the cache with modified data a second time to obtain the data associated with the address.

At E, the data associated with the address in the cache with modified data is obtained and provided to the next level cache.

At F, the data is placed into a location of the next level cache. In one embodiment, the flushing of a cache with modified data can be done periodically while the cache is idling and no stores are incoming.

Figure 2:
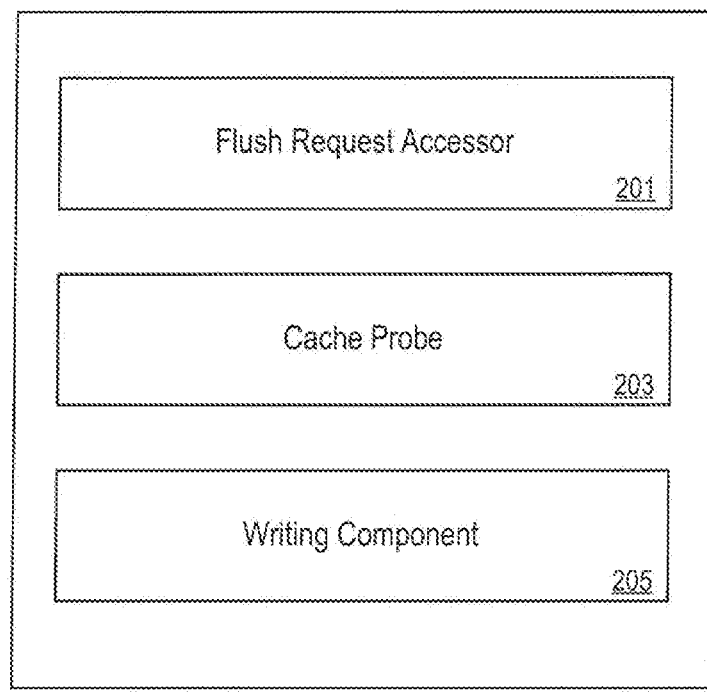
FIG. 2 shows components of a system for flushing a cache with modified data according to one embodiment.

Components of System for Flushing a Cache with Modified Data According to One Embodiment FIG. 2 shows components of a system 101 for flushing a cache with modified data according to one embodiment. In one embodiment, components of system 101 implement an algorithm for flushing a cache with modified data. In the FIG. 2 embodiment, components of system 101 include flush request accessor 201, cache probe 203 and writing component 205.

Flush request accessor 201 accesses a request to flush data from a cache with modified data to a next level cache. In one embodiment, the request can be one of an on-going series of periodic requests to flush data from the cache with modified data. In one embodiment, the flushing of data from the cache with modified data can be done to free up space for newer data based on the expectation that newer data will be received. In one embodiment, the request is directed to the next level cache (e.g., an L2 cache).

Cache probe 203, responsive to the request to flush data from a cache with modified data, accesses (e.g., probes) the cache with modified data using an index and a way and identifies an address associated with the index and way. Subsequently, using the address, cache probe 203 accesses (e.g., probes) the cache with modified data a second time and retrieves data that is located at the location that is indicated by the index and way.

Writing component 205 places the data that is retrieved into a location of the next level cache. In one embodiment, the contents of the cache with modified data are not included in the next level cache and thus before an entry (e.g., cache line entry with data) from the cache with modified data can be flushed to the next level cache, the address associated with the entry is obtained such that the entry can be identified and flushed to the next level cache and placed into a location there as a new entry.

It should be appreciated that the aforementioned components of system 101 can be implemented in hardware or software or in a combination of both. In one embodiment, components and operations of system 101 can be encompassed by components and operations of one or more computer components or programs (e.g., cache controller 107a in FIG. 1A). In another embodiment, components and operations of system 101 can be separate from the aforementioned one or more computer components or programs but can operate cooperatively with components and operations thereof.

Method for Flushing a Cache with Modified Data According to One Embodiment

Figure 3:
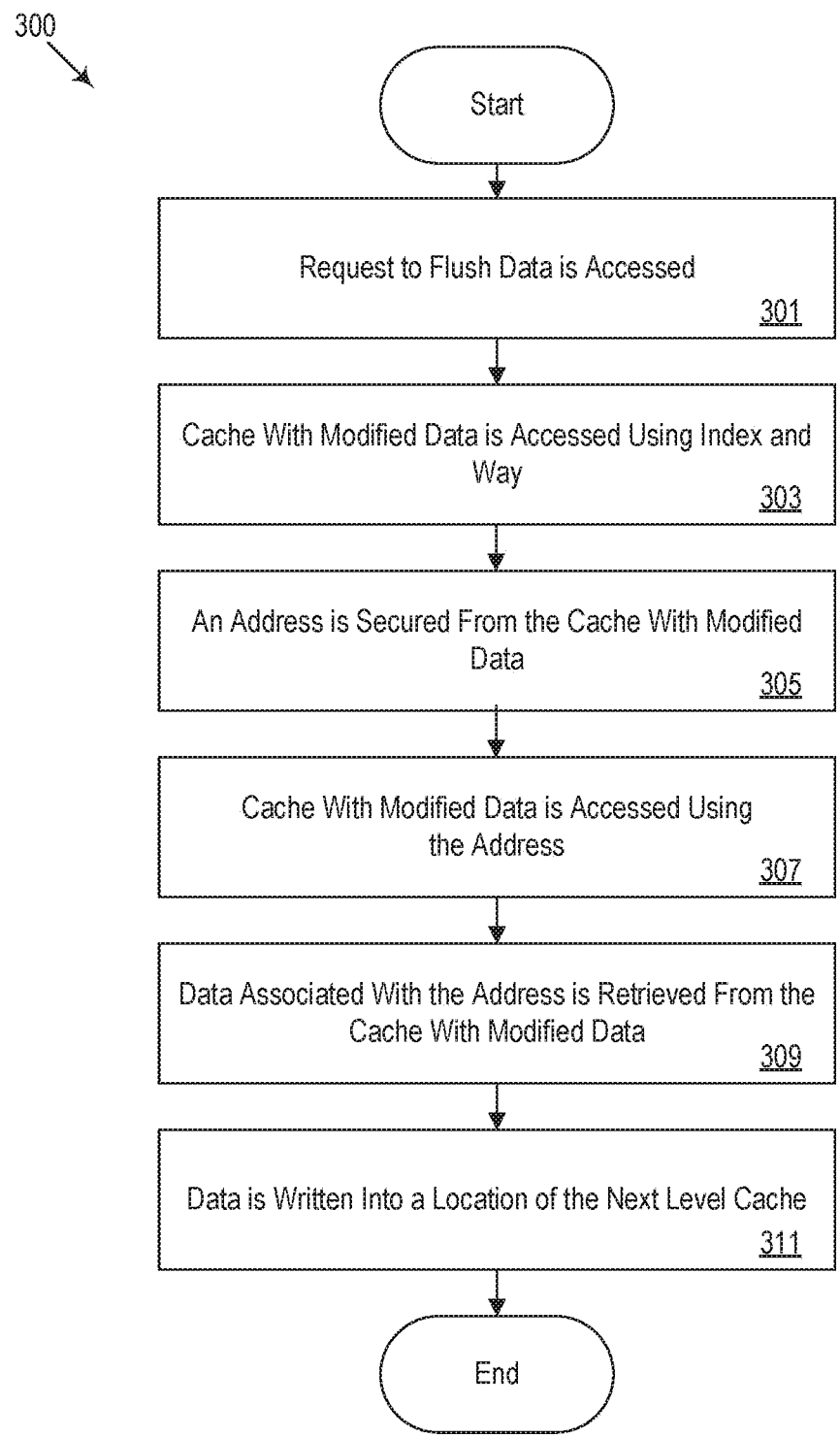
FIG. 3 shows a flowchart of the steps performed in a method for flushing a cache with modified data according to one embodiment.

FIG. 3 shows a flowchart 300 of the steps performed in a method for flushing a cache with modified data according to one embodiment. The flowchart includes processes that, in one embodiment can be carried out by processors and electrical components under the control of computer-readable and computer-executable instructions. Although specific steps are disclosed in the flowchart, such steps are exemplary. That is the present embodiment is well suited to performing various other steps or variations of the steps recited in the flowchart.

Referring to FIG. 3, at 301, a request to flush data from a cache with modified data to a next level cache is accessed. In one embodiment, the request can be one of an on-going series of periodic requests that flush data from the cache with modified data.

At 303, responsive to the request, a cache with modified data is accessed using an index and a way. In one embodiment, the index and way is used because the address associated with the desired entry is not available.

At 305, an address associated with said index and said way is secured (e.g., identified) from the cache with modified data. The securing of the address enables a subsequent retrieval of the entry associated with the address.

At 307, using the address, the cache with modified data is accessed a second time. In one embodiment, the access of the cache with modified data (in both 305 and 307) is executed using a probe that is controlled by the next level cache.

At 309, data is retrieved that is associated with the address. And, at 311, the data is written into a location of the next level cache.

With regard to exemplary embodiments thereof, systems and methods for flushing a cache with modified data are disclosed. Responsive to a request to flush data from a cache with modified data to a next level cache that does not include the cache with modified data, the cache with modified data is accessed using an index and a way and an address associated with the index and the way is secured. Using the address, the cache with modified data is accessed a second time and an entry that is associated with the address is retrieved from the cache with modified data. The entry is placed into a location of the next level cache.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for flushing a cache with modified data, the method comprising:
   receiving a request to flush modified data from a first cache to a second cache;
   accessing the first cache using an index and way associated with the modified data;
   identifying an address of the modified data in the first cache based on the index and way associated with the modified data;
   providing the address of the modified data to the second cache; and
   accessing the first cache to retrieve the modified data using the address.

2. The method of claim 1, further comprising:
writing the modified data to a location within the second cache.

3. The method of claim 2, wherein the modified data is retrieved from first cache and written to the location of the second cache at the pipeline speed of the second cache.

4. The method of claim 1, wherein the second cache is at a higher level in a cache hierarchy than the first cache.

5. The method of claim 1, wherein the modified data is not included in the second cache.

6. The method of claim 1, wherein the second cache uses a cache probe to access the first cache using the index and way associated with the modified data, identify the address of the modified data in the first cache based on the index and way associated with the modified data, and retrieve the modified data using the address.

7. The method of claim 1, wherein accessing the first cache to retrieve the modified data is performed by the second cache and in response to receiving the address of the modified data.

8. A processor, comprising:
a central processing unit;
a first cache; and
a second cache that includes a cache controller that includes:
 a flush request controller to process a request to flush modified data from the first cache to a second cache, and
 a cache probe to: access the first cache using an index and way associated with the modified data, identify an address of the modified data in the first cache based on the index and way associated with the modified data, and access the first cache to retrieve the modified data using the address.

9. The processor of claim 8, wherein the cache controller further comprises:
a writing component to write the modified data to a location within the second cache.

10. The processor of claim 9, wherein the modified data is retrieved from first cache and written to the location of the second cache at the pipeline speed of the second cache.

11. The processor of claim 8, wherein the second cache is at a higher level in a cache hierarchy than the first cache.

12. The processor of claim 8, wherein the modified data is not included in the second cache.

13. The processor of claim 8, wherein the cache probe is to access the first cache to retrieve the modified data in response to receiving the address of the modified data from the first cache.

14. A non-transitory machine-readable medium that stores instructions, which when executed by a processor causes the processor to:
process a request to flush modified data from a first cache to a second cache;
access the first cache using an index and way associated with the modified data;
identify an address of the modified data in the first cache based on the index and way associated with the modified data;
provide the address of the modified data to the second cache; and
access the first cache to retrieve the modified data using the address.

15. The non-transitory machine-readable medium of claim 14, wherein the instructions further cause to the processor to:
write the modified data to a location within the second cache.

16. The non-transitory machine-readable medium of claim 15, wherein the modified data is retrieved from first cache and written to the location of the second cache at the pipeline speed of the second cache.

17. The non-transitory machine-readable medium of claim 14, wherein the second cache is at a higher level in a cache hierarchy than the first cache.

18. The non-transitory machine-readable medium of claim 14, wherein the modified data is not included in the second cache.

19. The non-transitory machine-readable medium of claim 14, wherein the second cache uses a cache probe to access the first cache using the index and way associated with the modified data, identify the address of the modified data in the first cache based on the index and way associated with the modified data, and retrieve the modified data using the address.

20. The non-transitory machine-readable medium of claim 14, wherein accessing the first cache to retrieve the modified data is performed by the second cache and in response to receiving the address of the modified data.

* * * * *